Figure 1:
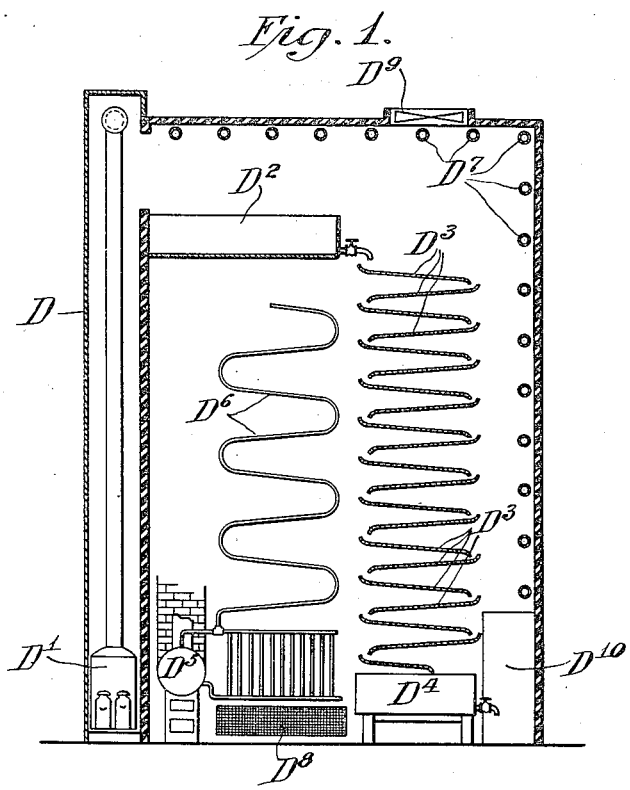

Mar. 6, 1923.

J. M. W. KITCHEN

APPARATUS FOR TREATING MILK

Filed Nov. 29, 1916

1,447,249

INVENTOR

Joseph Moses Ward Kitchen

Patented Mar. 6, 1923.

1,447,249

UNITED STATES PATENT OFFICE.

JOSEPH MOSES WARD KITCHEN, OF EAST ORANGE, NEW JERSEY.

APPARATUS FOR TREATING MILK.

Application filed November 29, 1916. Serial No. 134,040.

*To all whom it may concern:*

Be it known that I, JOSEPH MOSES WARD KITCHEN, a citizen of the United States, residing in the city of East Orange, county of Essex, and State of New Jersey, have invented Improvements in Apparatus for Treating Milk, of which the following is a specification.

The object of the present invention is to so treat milk as to secure an elimination from the milk, of the volatile diffusive contaminants that have been diffused into the milk from the blood current of the cow at the time of the production of the milk, or that otherwise have accumulated in the milk, and for securing such elimination without proliferative increase of bacterial infections in the milk that have occurred at or subsequent to the time of the production of the milk, and to prevent infections of the milk during the treatment of the milk; which treatment is both purifying and preservatory in its effect on the milk. This treatment is largely an application of such temperature influences as will substantially inhibit bacterial fermentation in milk during its treatment. Preferably, the procedures of the invention are applied conjointly with other steps taken during the time between the production of the milk and its herein specified treatment; and extending from the time subsequent from the specified treatment until the consumption of the milk. I may pasteurize the milk, tho preferably, I aerate and protect the milk against infections prior to the placing of the milk in the final container, and then pasteurize the milk in the final container.

In the ordinary treatment of milk at its point of production, it is little aerated, and only moderately cooled by placing it in containers in water having the temperature of well water. In exceptional cases milk is given a coincident cooling and partial aeration in reducing its animal heat to a degree of about 60° F., which treatment partly retards a souring fermentation in the milk. I point out the need of subjecting market milk, before the milk loses its natural antiseptic character, to such temperature influence as will inhibit growth of the bacteria that have gained access to the milk. It takes considerable time to aerate milk sufficiently to entirely eliminate the volatile diffusive contaminants in it that have been derived from the blood current of the cow. Therefore, I may subject milk before, during and after its pasteurization, to such exhaustive, continued aeration while subjecting the milk to such temperature influence as will inhibit substantially all growths of bacteria in the milk during its aeration. It is a demonstratable fact that in the destructive decomposition of bacteria, the protein molecules of the bacteria, in their splitting throw off poisonous matters; and it is practically impossible to avoid more or less infections of milk during its production. Hence, in my practice, I treat milk at all times during its handling, so that there will be substantially no increase in the growth of such infections during the treatment given. In the aerative treatment of milk, I accomplish that step in an atmosphere that has been freed from dust and bacteria by screening or other known methods; and so far as possible, I continually maintain the aerating atmosphere at a temperature that is substantially inhibitive of any growth of infections in the milk. Such atmospheric temperature may be either lower or higher than those which favor the incubation of bacteria.

Figure 2:
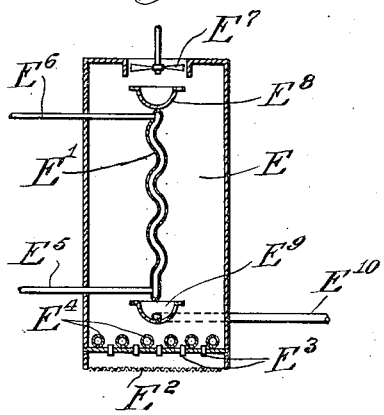

In the apparatus which I apply in carrying out this invention, I include such means as may conduce to convenience, economy and efficiency in the treatment. Such means may include heating and refrigerating means that will not only apply to aeration, but also to pasteurization and a quick cooling after pasteurization. In this invention I provide against such damage as may occur thru a direct contact of the milk with surfaces that are so hot as to scorch the milk, or so cold as to freeze the milk upon refrigerating surfaces. I do not confine myself to any particular means or method of applying the principles of the invention. The accompanying drawing illustrates one application of means that can be used. Fig. 1 is a diagrammatic, vertical cross-section of an aerating plant for carrying out the principles of the invention commercially in conjunction with means for adjuvant treatment of the milk in its preparation for market. Fig. 2 is a modified form, embodying the invention.

The reference characters indicate as follows:

D is a combined, milk mixing, aerating, heating and cooling plant. $D^1$ is a milk elevator. $D^2$ is a milk mixing vat. $D^3$ is a tower aerator. D⁴ is a receiving vat. D⁵ is a boiler. D⁶ are heating pipes. D⁷ are refrigerative piping. D⁸ is an air screen. D⁹ is an exhaust fan. D¹⁰ is an entrance door.

In milk treating plants it is common to elevate the shipping cans containing the milk to a mixing tank located at a high level, from which the milk is drawn and run over a so-called cooler such as is indicated by E¹ in the modified device E, Fig. 2; but in the apparatus shown in Fig. 1 I extend the amount of cooling, aerating and heating surface by the extended arrangement D³ shown in the drawing, which obviously would increase the time taken by the milk in its gravitation to the vat D⁴. The temperature of the apartment housing the apparatus is controlled by both cooling and heating piping which are brought into operation according to requirement. In operating the plant, the elimination of the volatilizable contents of the milk is brought about by transfer of the volatile contaminants to air thru the expansive diffusive force of gases. Fresh air passes into and thru the apartment, entering thru germ-filtering screens D⁸. In low temperature aeration the air is drawn up thru and forced out of the apartment by a motored fan D⁹. In heating the milk the upward travel of the air is effectuated by the heavier air from outside of the plant entering the apartment D at its lowest level and forcing the warmer air upwardly. In cooling the milk, cold air gravitates at the sides of the apartment D from the cooling pipes D⁷, the air passing upward in contact with the aerating device D³ where the air has contact with the milk as it is gravitating on the aerating surface of D³. In case of the milk not becoming sufficiently aerated in once gravitating over the aerating surfaces, it is again elevated, and the aerating treatment repeated. In the case of using an aerating surface like that shown in Fig. 2, in which E¹ is a device of such limited vertical extent that circuitous travel of the milk over the aerating surfaces is required, ordinary milk pumping apparatus would be used.

In Fig. 2, E represents an aerating apartment. E¹ is a corrugated aerator and cooler. E² is an air filtering screen. E³ are air apertures. E⁴ are heating pipes. E⁵ is a conduit thru which cooling water is forced upwardly, which finds its exit thru E⁶. E⁷ is an exhaust fan. E⁸ is a milk distributing trough. E⁹ is a trough conducting milk to the outlet E¹⁰.

Inventive disclosures herein stated are claimed in my copending applications Ser. Nos. 605,272 and 605,273, both filed Dec. 6, 1922.

What I claim as new is:

The apparatus for treating milk herein described, which consists in an aerating apartment, said apartment comprising aerating surfaces arranged to gravitate thereon thin films of milk from a high level in the apartment to a low level therein, said milk being aerated on said aerating surfaces, said apartment containing both heating pipes and cooling pipes and means for accurately controlling the temperature of the air in the apartment, and of the milk through the contact with the milk of an atmosphere in the apartment of a temperature such as to inhibit substantially all bacterial growths in the milk, said pipes and said aerating surfaces being spaced from each other by the interposed atmosphere of controlled temperature, said apparatus having means for the introduction into and removal of air from the apartment and for maintaining a current of the air between the aerating surfaces and said pipes.

JOSEPH MOSES WARD KITCHEN.

Witnesses:
GEO. L. WHEELOCK,
BEATRICE MIRVIS.